UNITED STATES PATENT OFFICE.

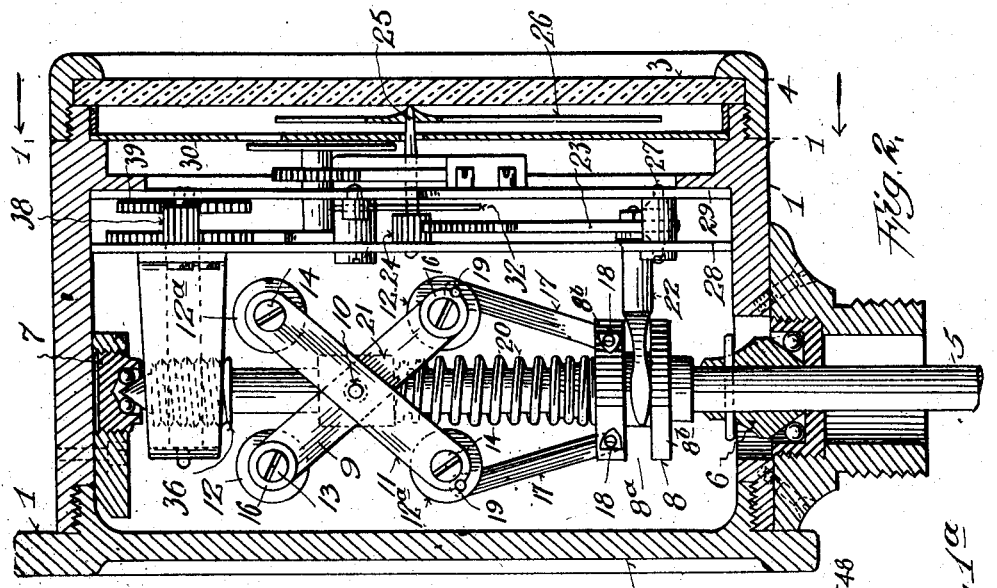

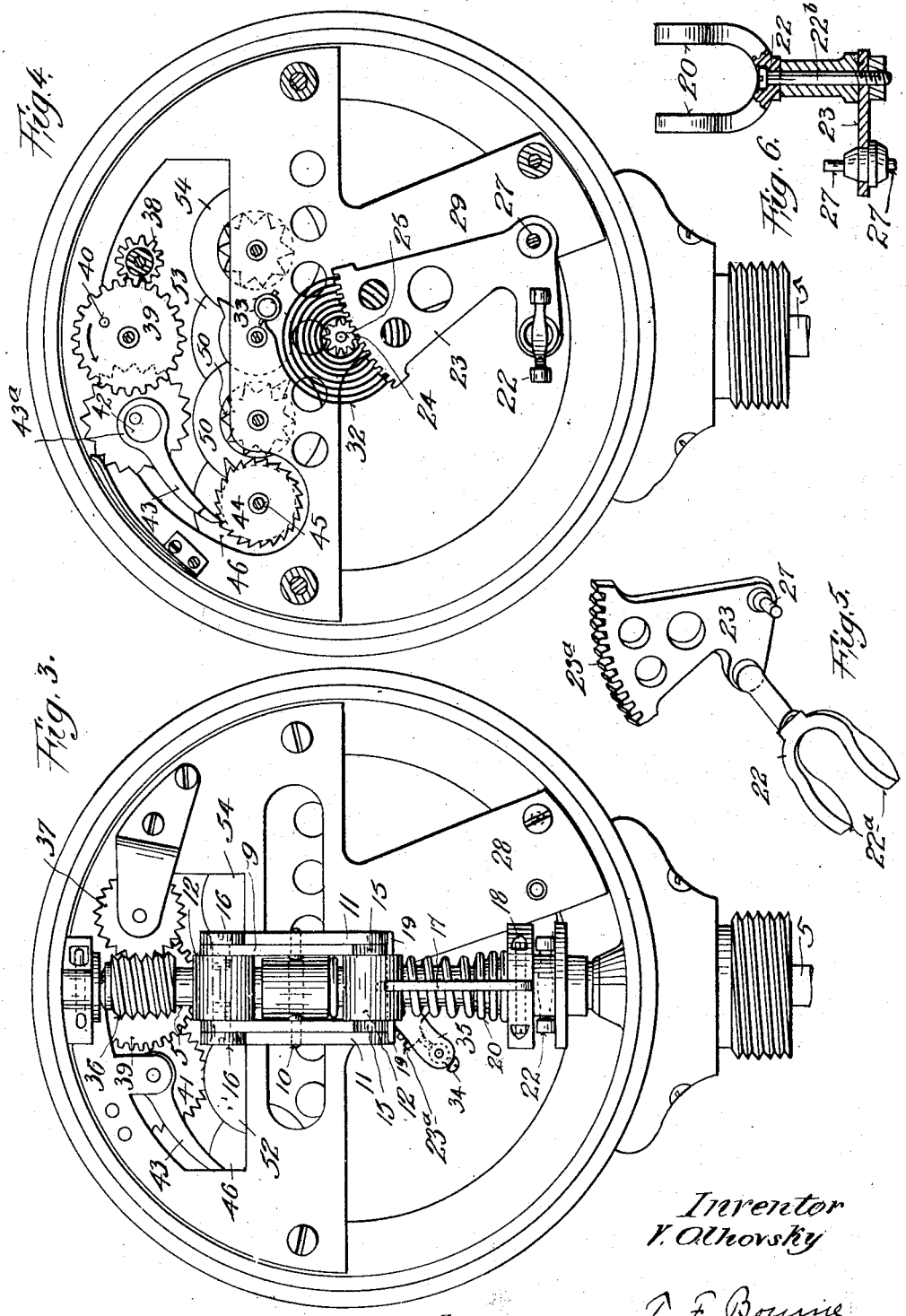

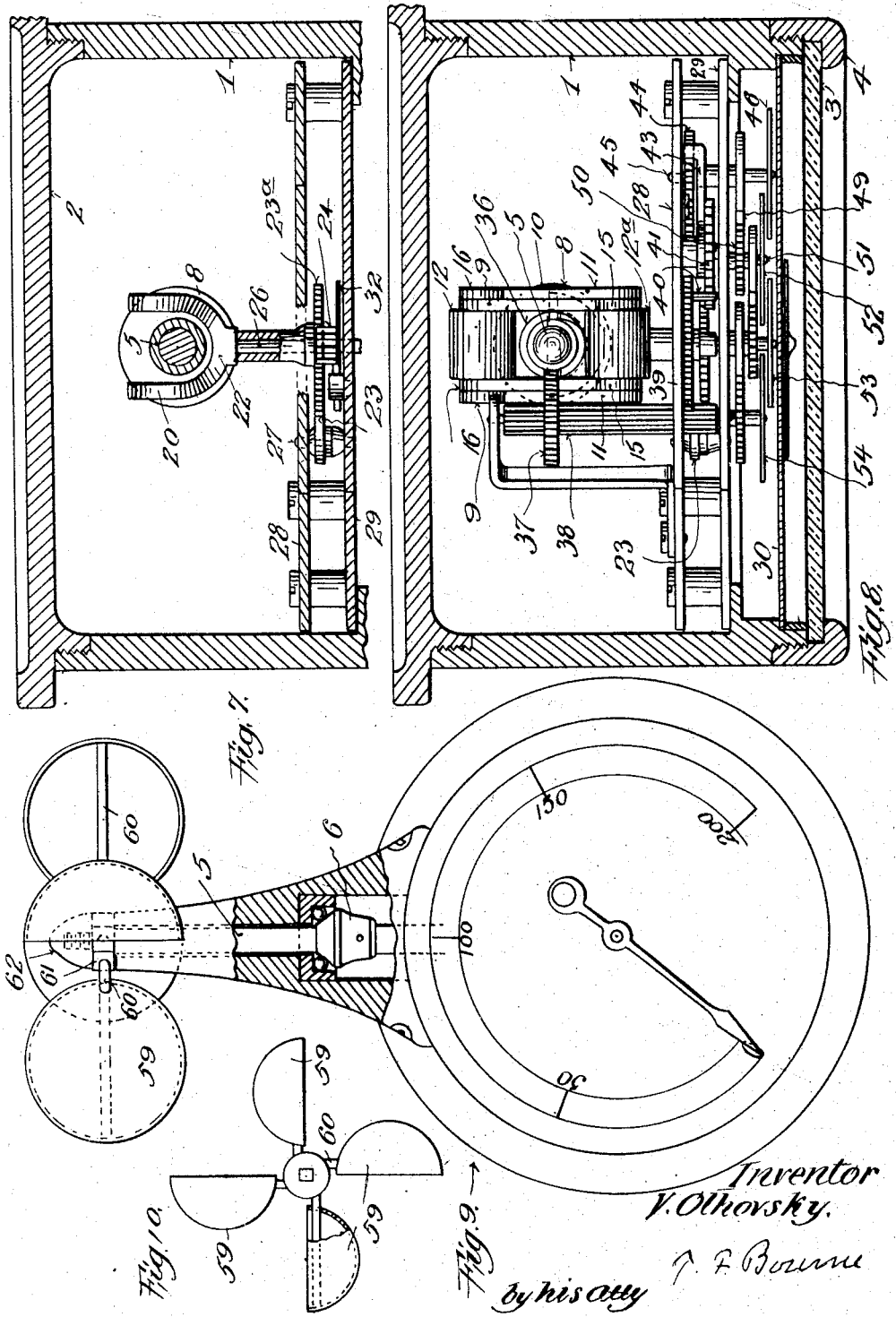

VLADIMIR OLHOVSKY, OF NEW YORK, N. Y., ASSIGNOR TO ERNST J. OHNELL, OF BROOKLYN, NEW YORK.

TACHOMETER.

1,327,629.  Specification of Letters Patent.  Patented Jan. 13, 1920.

Application filed May 31, 1918. Serial No. 237,618.

*To all whom it may concern:*

Be it known that I, VLADIMIR OLHOVSKY, a subject of Russia, and resident of New York city, borough of Manhattan, in the county of New York and State of New York, have invented certain new and useful Improvements in Tachometers, of which the following is a specification.

My invention relates to improvements in instruments adapted to measure speed or distance traveled of a moving element or body, and my improvements are particularly adapted for use in an instrument for indicating in units of time the speed of a rotating or moving object.

Heretofore instruments such as tachometers, speedometers and the like have utilized rotating ball-weights operating by centrifugal action during rotation to cause the operation of indicating devices, and one of the objects of my invention is to provide means in connection with such class of weights whereby the parts will be properly balanced and their action will be uniform during varying speeds of rotation, whereby accuracy of operation and steadiness of an indicator or pointer may be attained.

A further object of my invention is to provide simple and efficient mechanism operable from a rotating part to indicate units of elapsed time calculated according to the number of rotations of such part during such unit period.

My invention comprises novel details of improvement and combinations of parts that will be more fully hereinafter set forth and then pointed out in the claim.

Reference is to be had to the accompanying drawings forming part hereof, wherein, Figure 1 is a partly sectional front view of an instrument embodying my invention, substantially on the line 1, 1, in Fig. 2; Fig. 1$^a$ is a face view of the tachometer, on a reduced scale; Fig. 2 is a substantially vertical section through Fig. 1; Fig. 3 is a view looking from the left side of Fig. 2, the rear cover plate being removed; Fig. 4 is a view substantially similar to Fig. 3, parts having been removed; Fig. 5 is a detail perspective view of the operating fork and rack controlled by the rotative weights; Fig. 6 is a detail section of part of Fig. 5; Figs. 7 and 8 are horizontal sections respectively through Fig. 2; Fig. 9 is a partly sectional view illustrating my improvements adapted for operation during travel, as upon a flying machine; and Fig. 10 is a detail of part of Fig. 9.

Similar numerals of reference indicate corresponding parts in the several views.

The numeral 1 indicates a casing or frame which may be of any suitable construction, shown provided with a rear cover plate 2 and having a transparent front plate 3 removably attached to the frame by a bezel 4, all of which parts may be of any suitable construction. At 5 is a shaft extending within frame 1 and journaled in suitable bearings, indicated generally at 6, 7, carried by said frame. Upon said shaft is slidably mounted a collar 8 having an annular groove 8$^a$. A pair of parallel arms 9 are spaced on opposite sides of shaft 5 and are pivotally connected thereto at their midlengths by a pin or pivot 10 that passes through and is secured to shaft 5, or separate pivots may extend from opposite sides of said shaft for said arms. A pair of parallel arms 11 are also spaced on opposite sides of shaft 5, the arms 11 being respectively outside of, or receiving between them, the pair of arms 9, as indicated in Figs. 3 and 8, the arms 11 being also pivoted at their midlengths upon the pin or pivots 10. All of said arms project equally on opposite sides of pin or pivots 10 in equal relation. At 12, 12$^a$ are weights, all by preference equal in dimensions and weight, carried by said pairs of arms. The weights 12 are between the outer ends of the spaced arms 9 and are secured thereto by screws 13, at opposite ends, and the weights 12$^a$ are between the outer ends of the spaced arms 11 and are secured thereto by screws 14 (Fig. 2). To balance the weight of said parts and because the arms 11 are outside of and more spaced apart than the arms 9, I provide bushings or rings 15 interposed between the corresponding ends of arms 11 and the adjacent weights 12$^a$ through which the screws 14 pass, and upon the screws 13 of arms 9 I mount bushings or rings 16, outside of the arms 9 that correspond to the bushings or rings 15. By the arrangements described the arms 9 may rock within the arms 11, and, since the arms with their weights project equally on opposite sides of the pins or pivots 10 the action of said arms and weights will be accurately balanced during rotation thereof by and with shaft 5, and steady and equal action of said arms and weights in all the positions will result, reducing unequal and vibratory action that otherwise might result. Said arms are movably connected with collar 8 by means of links 17 that are pivotally connected thereto by pins 18 and are pivotally connected with the lower weights 12, 12ᵃ by pins 19 (Fig. 2). A spring 20 shown coiled around shaft 5 bears at one end against collar 8 and at the opposite end against a stop or enlargement 21 on said shaft, (through which stop or enlargement pin 10 passes), whereby said collar is pressed in a direction away from said arms. When shaft 5 is rotated the arms, weights, links and collar will be caused to rotate therewith, in a usual manner of ball or governor weights, with the advantages above referred to due to my improvements.

At 22 is indicated a fork member having its prongs 22ᵃ located in groove 8ᵃ of collar 8 so as to move with the collar, which fork is pivotally carried by a rack sector 23, the teeth 23ᵃ of which are in mesh with a pinion 24 secured upon the shaft 25 of an indicator or pointer 26. The fork 22 is pivotally carried upon a stud or pin 22ᵇ secured to sector 23 eccentrically with respect to the pivots 27 of the latter which are journaled between the frame plates 28, 29 secured within frame 1, in which plates shaft 25 is journaled. The prongs of fork 22 are spaced sufficiently wide apart to receive freely between them the midportion of collar 8 within groove 8ᵃ thereof, to permit the fork to have proper lateral movement relatively to the collar due to the circular path in which the fork travels with the collar around the axis of pivots 27 of sector 23. To reduce friction between the rotating surface of collar 8 in contact with the prongs of fork 22, said prongs within the groove of said collar are curved on their upper and lower edges, as indicated in Figs. 2 and 5, in such a manner as to contact only approximately at one point with the surface of the webs 8ᵇ of the collar. By having the fork in the groove of collar 8 bearing on opposite sides of the latter, and said fork pivotally supported upon rack sector 23, chattering of the connection between such collar and rack sector is prevented, since the fork will remain equally balanced in the collar and steadiness of the pointer will result, and this advantage is also attained by reason of the pivotal connection of the fork with the rack sector. The indicator or pointer 26 is adapted to sweep in front of a dial 30 secured within frame 1 and provided with suitable numerals or other marks, as at 31, to indicate the speed of operation of a part, such as a rotative engine shaft, that is to be connected with shaft 5 in any suitable manner, such as by a flexible shaft not shown.

As a means to aid in steadying the indicator 26 during its operation, I provide a hair spring 32, one end of which is secured to shaft 25 and the other end to the frame at 33, to resist the operation of said shaft by rack sector 23. In order accurately to set indicator 26 at the zero point of the dial when the instrument is not in operation I provide an adjusting screw 34 to oppose sector 23 and which may be carried by an extension 35 of the framing (Figs. 1 and 3), whereby the edge of the sector may abut against said screw when the instrument is idle, and by turning the screw the rack and indicator may be set.

In order to indicate in units of time the period of time during which the speed of operation of the aforesaid rotating part or engine shaft is being indicated by pointer 26 and dial 30, I provide mechanism operated by shaft 5 coincidently with the operation of indicator 26, arranged as follows:

A worm 36 on shaft 5 is in mesh with a worm wheel 37 (Fig. 3) which is provided with a pinion 38 whose pivots are suitably journaled in the inner framing, which pinion is in mesh with a gear 39 shown journaled between the frame plates 28 and 29 (Figs. 3 and 8). Gear 39 is provided with a pin 40 (Figs. 4 and 8) adapted to engage successively the teeth of a spur or star wheel 41, shown journaled between the plates 28, 29 whereby each time that wheel 39 and pin 40 rotate once said pin will cause wheel 41 to be rotated the space of one tooth. Wheel 41 is provided with a suitable eccentric 42 (Fig. 4) receiving the annular portion or strap 43ᵃ of a pawl or dog 43 that is coöperative with a ratchet wheel 44, the shaft or pivot 45 of which is journaled in plates 28, 29 (Figs. 4 and 8). The shaft 45 carries a disk 46 located behind dial 30 and bearing suitable numerals 47 (Fig. 1) adapted successively to appear through a hole 48 in dial 30 (Fig. 9). The numerals 47 in the example illustrated are intended to indicate minutes of elapsed time (with relation to the normal speed of an engine shaft), and one rotation of disk 46 will indicate sixty minutes, and so on in proportion for periods of rotation thereof. The shaft 45 is provided with a projection 49 adapted to operate a toothed or star wheel 50 having a shaft 51 journaled between the plates 28, 29 (Figs. 4 and 8). Shaft 51 carries a disk 52 (Figs. 4 and 8) having numerals 53 (Fig. 1) adapted to appear through a hole 54 in dial 30 (Fig. 9), the arrangement being such that each time disk 46 makes a complete rotation the disk 50 will be rotated one tenth of a complete rotation, whereby to indicate hours from 1 to 10, through hole 54 of the dial. Additional disks 53, 54 respectively bearing numerals 55, 56 may be carried upon shafts journaled in plates 28, 29, and operated by gearing similar to that before described, whereby for each complete rotation of disk 52 the disk 53 will be rotated one step to indicate hours in tens through a hole 57 in dial 30, and whereby for each complete rotation of disk 53 the disk 54 will be rotated one step to indicate hours in hundreds through hole 58 in dial 30. Suitable springs, as at $a$ (Fig. 1) may be carried by the plate 29 to serve as back stops to prevent reverse rotation of the indicating disks.

The arrangement described is such that when shaft 5 is not rotating no units of time will be counted, but as soon as shaft 5 commences to rotate the gearing described will cause reciprocations of pawl 43 by means of eccentric 42 in such a manner as to cause the indicating disk 46 to commence to operate, and the operation of said disk and its operation of disk 52, and so on through the remaining disks 53, 54 (according to the rotations of the engine shaft) will continue during the operation of shaft 5, whereby the units of time during which shaft 5 operates may be readily determined by first noting the condition of the indicating disks when shaft 5 commences to operate, and noting the indication of the disks when the shaft stops operating, while at the same time the indicator 26 will indicate upon the numerals 31 of the dial the speed of operation of shaft 5 at any given moment, as derived from the engine shaft that drives shaft 5.

My invention is particularly useful in flying machines, wherein it is important to note the time of operation of the engine shafts, and my invention is particularly applicable for use in aeroplanes. In the arrangement of gearing for indicating time illustrated in the accompanying drawings, it may be assumed that the proper operating speed of the engine shaft is 1200 rotations per minute, and the gearing disclosed is such that when the engine shaft that is connected to shaft 5 of my improved tachometer is rotating at 1200 rotations per minute disk 46 will be rotated in such a manner as to indicate minutes of time in proportion to such rotation of the engine shaft, and so on for hourly indications by the disks 52, 53 and 54. In case the engine shaft rotates at less speed than 1200 per minute the indicating disks 46, 52, 53 and 54 will operate correspondingly slower, and will also operate correspondingly faster in case the engine shaft speeds above 1200 rotations per minute. It, therefore, will be understood that in accordance with the gearing disclosed for operating the indicating disks the running time of the engine proportionate to the rotation of its shaft at the rate of 1200 rotations per minute will be indicated, and no clockworks are required to indicate the time of operation of the engine.

While I have referred to operating shaft 5 by connection thereof with the drive shaft of an engine, it will be understood that my improvements may be utilized for operation by any other part whose speed is to be counted, such as any kind of motor and other machinery. Furthermore, my improvements may be utilized for indicating speed of travel and time elapsed in travel of an air ship or other vehicle by the application to shaft 5 of my improved tachometer of cups or buckets 59, as for instance of the class used in anemometers, indicated in Figs. 9 and 10. The arms 60 of such cups or buckets may be secured to shaft 5 in any suitable manner, as by being attached to a disk 61 held upon the shaft by a nut 62. When the aeroplane or vehicle having the tachometer with the cups or buckets thereon travels, the cups will cause rotation of shaft 5 and its rotation, through the mechanism described, will cause the indicator 26 to show on the dial the speed of travel while the indications 46, 52, 53 and 54 will indicate through the corresponding holes in the dial the elapsed time of travel calculated in proportion to the indication of a definite number representing speed of travel upon dial 30, substantially in the manner before described.

While I have referred to an indicator 26 and dial 30, it will be understood that any other known indicating devices, such as a rotating drum bearing numbers, may be operated by rack 23 to indicate the speed of rotation of shaft 5. It will also be understood that the particular arrangement of indicating disks and gearing for operating them may be varied, and that such disks may be arranged to indicate elapsed distances instead of elapsed time calculated according to the rotation of shaft 5 in relation to the indications given by indicator 26 and dial 30.

It will be further understood that changes may be made in the details of construction set forth without departing from the spirit of my invention.

While I have referred to the gearing as adapted for an engine shaft having a proper operating speed of 1200 rotation per minute, it will be understood that if the proper rotations of an engine should be more or less than such 1200 rotations per minute the gearing would be arranged accordingly to cause indication of elapsed units of time, such as minutes and hours, proportional to such proper speed of said shaft.

Having now described my invention what I claim is:—

A measuring instrument comprising a frame, a rotative shaft journaled therein, two pairs of arms pivotally carried by said shaft and projecting on opposite sides of their axes, one pair of arms being between the other pair of arms, weights between each pair of arms at opposite ends thereof, bushings between the outer arms and the corresponding weights, means securing said arms and bushings to said weights, bushings on the outside of the inner pair of arms, means securing said bushings to said arms and weights whereby said parts are equally balanced on opposite sides of the shaft and pivot, and spring means connecting said arms with said shaft.

Signed at New York city, in the county of New York, and State of New York, this 23rd day of May, A. D. 1918.

VLADIMIR OLHOVSKY.